(12) United States Patent
Yoon

(10) Patent No.: US 12,510,765 B2
(45) Date of Patent: Dec. 30, 2025

(54) METHOD AND APPARATUS TO IMAGE A POSITION AND ROTATION OF AN OPHTHALMIC LENS WORN ON A HUMAN EYE

(71) Applicant: University of Rochester, Rochester, NY (US)

(72) Inventor: Geunyoung Yoon, Houston, TX (US)

(73) Assignee: University of Rochester, Rochester, NY (US)

( * ) Notice: Subject to any disclaimer, the term of this patent is extended or adjusted under 35 U.S.C. 154(b) by 467 days.

(21) Appl. No.: 18/088,967

(22) Filed: Dec. 27, 2022

(65) Prior Publication Data

US 2023/0221578 A1  Jul. 13, 2023

Related U.S. Application Data

(60) Provisional application No. 63/266,700, filed on Jan. 12, 2022.

(51) Int. Cl.
*G02C 7/02* (2006.01)

(52) U.S. Cl.
CPC ............. *G02C 7/021* (2013.01); *G02C 7/027* (2013.01)

(58) Field of Classification Search
CPC ... G02C 7/021; G02C 7/027; G01M 11/0207; G01M 11/0264; G01M 11/0221
See application file for complete search history.

(56) References Cited

U.S. PATENT DOCUMENTS 8,388,133 B2 * 3/2013 Freson ................ G02C 13/003
                                                        351/159.73
9,925,038 B2 * 3/2018 Yoon ..................... G02C 7/027

\* cited by examiner

*Primary Examiner* — Tuyen Tra
(74) *Attorney, Agent, or Firm* — Harris Beach Murtha Cullina PLLC

(57) ABSTRACT

A method comprises positioning, on a subject's eye, an ophthalmic lens having one or more physical marks, directing light through the eye to cause reflection of light off the retina of the eye, visualizing one or more images representative of the at least one physical mark and determining an orientation of the ophthalmic lens based on the one or more images.

12 Claims, 5 Drawing Sheets

LENS WITH AT LEAST ONE MARKER ON EYE OVER PUPIL (WHITE CIRCLE)

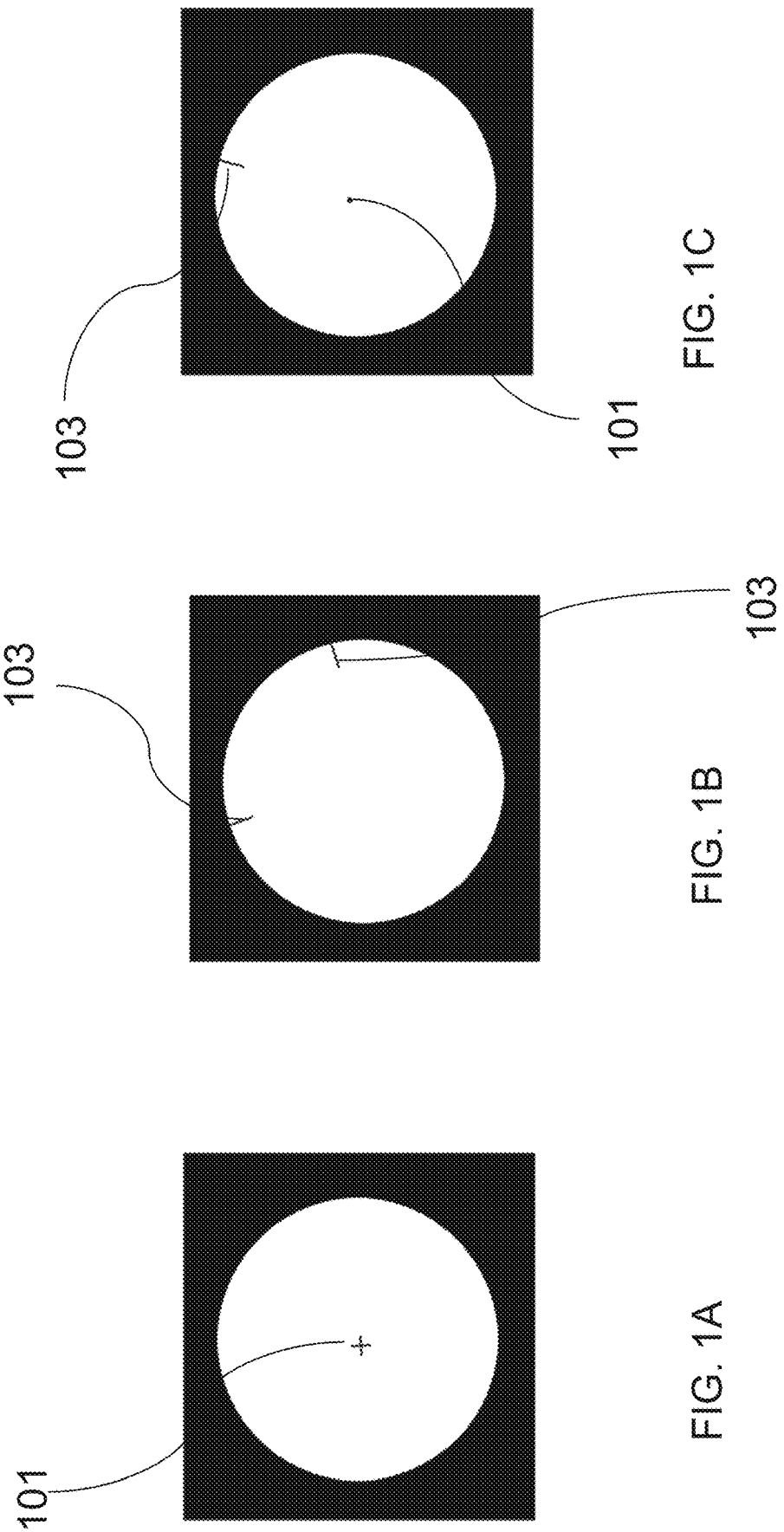

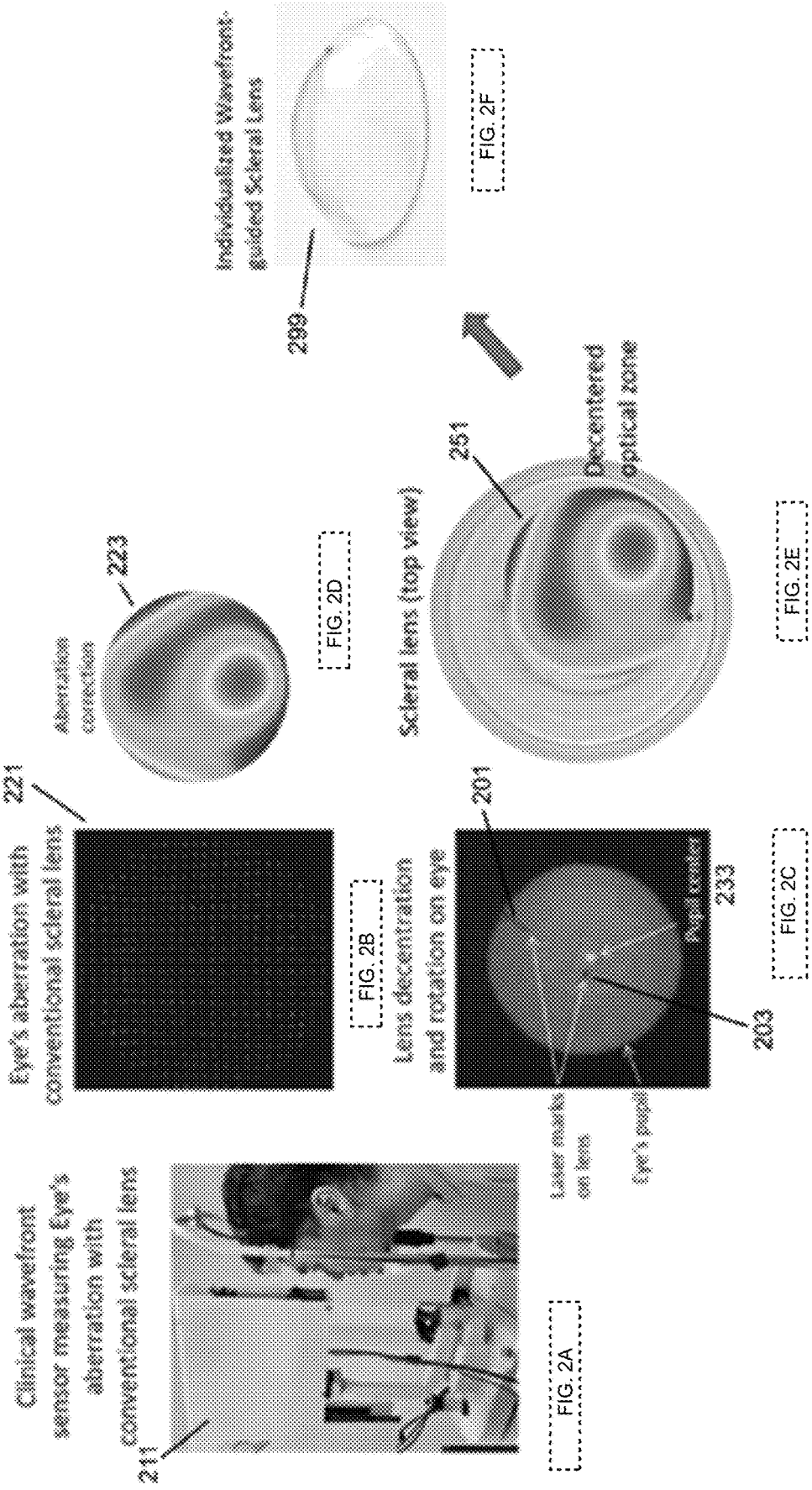

METHOD AND APPARATUS TO IMAGE A POSITION AND ROTATION OF AN OPHTHALMIC LENS WORN ON A HUMAN EYE

CROSS-REFERENCE TO RELATED APPLICATIONS

This application claims priority to and the benefit of U.S. provisional patent application Ser. No. 63/266,700, METHOD AND APPARATUS TO IMAGE A POSITION AND ROTATION OF AN OPHTHALMIC LENS WORN ON A HUMAN EYE, filed Jan. 12, 2022, which application is incorporated herein by reference in its entirety.

STATEMENT REGARDING FEDERALLY FUNDED RESEARCH OR DEVELOPMENT

This invention was made with government support under EY025095 awarded by the National Institutes of Health (NIH). The government has certain rights in the invention.

FIELD OF THE APPLICATION

The application relates to imaging an ophthalmic lens, and, more particularly, relates to imaging an ophthalmic lens worn by a subject.

BACKGROUND

Advanced vision correction using freeform ophthalmic lenses has been recognized as an important innovation to improve quality of vision.

SUMMARY

A method to quantify lens position and rotation of an ophthalmic lens worn by a subject comprises providing the ophthalmic lens having at least one physical mark and a source of illumination to cause a reflected light from a retina of an eye, observing a shadow of the at least one physical mark in the reflected light and quantifying a lens position of the ophthalmic lens based on the shadow.

In embodiments, the step of providing comprises providing the ophthalmic lens having at least one physical mark including at least one of a mark at a center of the ophthalmic lens, two or more marks at a periphery of the ophthalmic lens, or a mark at a center of the ophthalmic lens and one or more additional marks at a periphery of the ophthalmic lens. The mark at a center of the ophthalmic lens comprises a crosshair.

In other embodiments, the step of observing comprises imaging the at least one physical mark at an entrance pupil plane of the eye.

In certain embodiments, the step of quantifying comprises quantifying the lens position along a line of sight of the eye.

In embodiments, the step of providing comprises providing a wavefront sensor to cause the reflected light from the retina. In one aspect, the method further includes measuring aberrations of the eye with the wavefront sensor.

In other embodiments, the step of providing comprises providing at least one lathe mark. In aspects, the step of providing comprises providing at least one mark written by one of abrasion, ablation or laser.

In certain embodiments, the step of observing comprises observing the shadow of the at least one physical mark in the reflected light, the at least one physical mark otherwise substantially not visible by direct illumination to a front surface of the ophthalmic lens.

In embodiments, the step of providing comprises providing one of a freeform ophthalmic lens, soft contact lens, hard rigid gas permeable contact lens of scleral lens.

In other embodiments, the step of providing comprises providing the ophthalmic lens having the at least one physical mark without an inking process.

In accordance with another illustrative embodiment of the present disclosure, an apparatus to quantify lens position of an ophthalmic lens worn by a subject comprises a source of illumination to cause a reflected light from a retina of an eye having disposed thereon an ophthalmic lens and an imager configured to capture, within the reflected light, an image of at least one physical mark on the ophthalmic lens to facilitate determination of a position or orientation of the ophthalmic lens on the eye.

In embodiments, the image is made at an entrance pupil plane of the eye.

In other embodiments, the apparatus includes a processor for at least one of quantifying or determining the position or orientation of the ophthalmic lens based on the image captured by the imager of the at least one physical mark.

In certain embodiments, the apparatus includes a wavefront sensor having the source of illumination and the imager.

In accordance with another illustrative embodiment of the present disclosure, a method comprises positioning, on a subject's eye, an ophthalmic lens having one or more physical marks, directing light through the eye to cause reflection of light off the retina of the eye, visualizing one or more images representative of the at least one physical mark and determining an orientation of the ophthalmic lens based on the one or more images.

In embodiments, the method further includes repositioning the ophthalmic lens based on the one or more images.

In other embodiments, visualizing one or more images includes capturing, with a sensor, image data associated with the one or more images.

In certain embodiments, the ophthalmic lens includes first and second marks.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 1A is a drawing showing an exemplary contact lens with a cross hair marker in the center of the lens on a human eye where the pupil of the eye is visible;

FIG. 1B is a drawing showing an exemplary contact lens with markers at the periphery of the lens;

FIG. 1C is a drawing showing an exemplary contact lens with a markers at the center of the lens and a marker at the periphery of the lens;

FIGS. 2A-2F are views illustrating one exemplary methodology for measuring decentration and rotation of a subject eye according to one or more illustrative embodiments of the present invention;

DETAILED DESCRIPTION

Figure 3A:
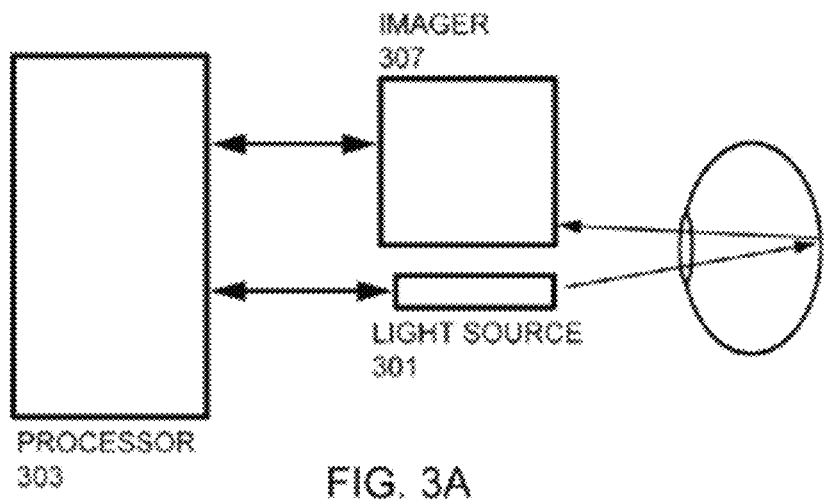
FIG. 3A is a block diagram of an exemplary apparatus suitable to quantify lens position of an ophthalmic lens worn by a subject according to one or more illustrative embodiments of the present invention.

Particular embodiments of the present disclosure are described hereinbelow with reference to the accompanying drawings. However, it is to be understood that the disclosed embodiments are merely examples of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to employ the present disclosure in virtually any appropriately detailed structure.

Advanced vision correction using freeform ophthalmic lenses has been recognized as an important innovation to improve quality of vision. A corrective lens, such as a contact lens, is made to fit over the outer front curvature of the eye. By default, the contact lens has a physical lens center and a rotational orientation, for example, and without limitation, an up (a physical lens rotational reference). The contact lens is positionable onto a subject's eye having a pupil center.

The subject's pupil center with respect to the lens physical center is defined by where the pupil appears under the contact lens as worn by the subject. Accounting for the difference between the physical location of the pupil of the eye and a subject's actual line of sight of the eye with respect to the physical lens center is called decentration. Similarly, the worn contact lens has a reference position or rotation, which can be taken, for example, as in the vertical direction, i.e., "up" (e.g., a vertical meridian). However, an optimal optical correction for that eye will typically include some rotation with respect to the lens reference position as worn on the subject's eye.

To reliably correct the optical defects of the eye, i.e., wavefront aberrations, quantifying the eye's aberration as well as the optimal position and rotational orientation of the corrective optics or the contact lens on the eye is important. In U.S. Pat. No. 9,925,038, SYSTEM AND METHOD FOR DESIGNING WAVEFRONT-GUIDED OPHTHALMIC LENSES, a corrective lens is described that combines a measured aberration with decentration and rotation of the lens to design customized optical surface profiles to reliably achieve vision correction for the individual eyes of a subject. The '038 patent is also assigned to the University of Rochester, and is incorporated in its entirety by reference herein for all purposes.

As described in the '038 patent, the decentration and rotation for a given eye can be measured by any suitable technique with respect to marks on the lens, also known as lens marks. At the time of the '038 patent, black ink marks on the lens were utilized, typically, by manually making the marks with a black marking pen.

Contact lenses can be produced by a lathe which cuts the lens to a predefined shape. The lathe can also write reference marks on the contact lens. Reference marks can vary from a center mark, a center cross hair, one or more marks around the periphery of the lens, and combinations thereof. However, the lathe marks can be so small, that the marks are substantially not visible in a conventionally front lit image of the contact lens on the subject's eye. Moreover, it is difficult to see small reference markers on the surface of the lens, such as the markers (marks) created by a lathe. Due to the nature of lens material being transparent, it has been particularly challenging to visualize and/or image any reference markers on the surface created by a lathe.

As described hereinabove, the conventional approach to overcome this problem relies on manual inking of the markers that can be imaged with a camera. Therefore, even where such lathe marks (e.g. lens marks by lathe or other suitable physical means, marks written by laser, etc.) are present, black marker pens are still used. Manual marking by pen process is not precise. Manual marking also makes it difficult to automate the design and manufacturing process of the lens, limiting the potential of successful commercialization.

In accordance with one illustrative embodiment, it is realized that when the lathe marks or any other suitable similarly small marks are present on the lens, when illuminated from behind, the previous difficult to see marks, now become particularly visible as shadows, both for visualization by the practitioner as well as clearly showing in camera images. Such lighting from behind is called retro-illumination. Here retro-illumination can be accomplished using light reflected internally from the retina at the back of the human eye, by the illuminating the retina.

One illustrative methodology in accordance with the principles of the present invention includes an imaging process using retro-illumination to sharply visualize lathe markers on the lens surface without the inking process. This method also enables imaging of the lens markers on the eye's entrance pupil plane, which beneficially allows for quantifying or determining the lens position along the line of sight, an important visual axis along which advanced vision correction is applied.

Any suitable light source can be used to illuminate the retina at the back of the subject's eye to read the position of the lens markers, and to determine decentration and rotation for the lens shape of the corrective lens manufactured via otherwise conventional lens manufacturing methods.

Typically, the subject's eyes are measured for aberration concurrently with the measurement of the physical lens fitting to determine decentration and rotation. In illustrative embodiments, in some instances, the very same light illumination of the retina by the instrument used to measure aberrations of the eye, can be used for a retro-illumination of physical lens marks, such as lathe written lens marks by observing the shadows caused by the lens marks. For example, in illustrative embodiments, the methodology of the present invention can be implemented into an ocular wavefront sensor which illuminates the retina for aberration measurements.

FIG. 1A is a drawing illustrating an exemplary contact lens 10 with a cross hair marker 101 in the center of the lens on a human eye where the pupil of the eye is visible. FIG. 1B is a drawing illustrating an exemplary contact lens 10 with markers at the periphery 103 of the lens. FIG. 1C is a drawing illustrating an exemplary contact lens 10 with a marker 101 at the center of the lens and a marker 103 at the periphery of the lens. As described in the aforementioned '038 patent, a contact lens can be provided where the corrective optics are displaced somewhat both rotationally, and laterally along the surface of the contact lens (decentration). When fitting a correction to a particular human eye, by use of markers 101, 103, the correction can be rotated and/or translated over the pupil manually or more desirably by an automated process (e.g. as described in the '038 patent), to find an optimal correction for that human eye, such as can be determined by use of a wavefront sensor.

For example, with the contact lens of FIGS. 1A-1C, the specific subject contact lens can be made with the measured rotation and lateral offset of the corrective pattern (e.g., a higher order aberration corrective design), such that when the contact lens is normally worn, the corrective shape as referenced by markers 101, 103 is actually slightly rotated, as well as translated from the physical center of the pupil as shown by arrow 127.

In one illustrative embodiment, the markers 101, 103 are configured and dimensioned to be a size, for example and without limitation, a minimal size, just large enough to be visible with illumination by light reflected from behind the cornea, typically light reflected from the retina. At the same time, the markers can be small (short and/or narrow) such that the markers do not adversely change the correction measurements, such as by a wavefront sensor.

In illustrative embodiments, any suitable marks (including dots, lines, etc.) can be used. Suitable marks include, for example, two marks, one mark each at different points along the periphery of the lens (FIG. 1C), one mark as a line at the periphery of the lens and a second mark near the center of the lens (e.g., a short line near the center of the lens) (FIG. 1B), one or more marks at the center of the lens, including a cross line, cross hair mark, and any combinations (FIG. 1C) thereof.

Any suitable marking method can be used, such as, for example, marks made by a lathe, any other suitable physical marking method such as by ablation, abrasion, etc., marks written by laser, etc.

FIGS. 2A-2F are drawings or views illustrating one exemplary methodology for measuring decentration and rotation of a subject eye in accordance with the principles of the present invention. To determine an individualized subject wavefront-guided lens, clinical wavefront sensor instrument 211 measures the aberrations of the eye while the subject is wearing a scleral lens (contact lens worn on the eye) as depicted in FIG. 2A. As illustrated in FIGS. 2A and 2B, the wavefront sensor 211 measures the aberrations of the eye as shown by the eye's aberration with the scleral lens 221, and determines an aberration correction 223 depicted in FIG. 2D. The relatively small and/or fine laser marks retro-illuminated by light provided by the wavefront sensor instrument 211 are reflected by the retina, where the marks were previously written onto the scleral lens, now appear as clearly visible shadows 201, 203. In this illustrative embodiment, there is a mark 201 at the periphery and a mark 203 at the center of the lens. The scleral lens in the top view of FIG. 2E illustrates the previously measured aberration correction now as a decentered and rotated scleral lens correction 251 customized for the actual position of the subject's pupil center 233, line of sight of the eye, and eye rotation. FIG. 2F illustrates the individualized wavefront-guided scleral lens 299 manufactured for the subject based on the data, parameters and process obtained and utilized in accordance with FIGS. 2A-2E.

Figure 3B:
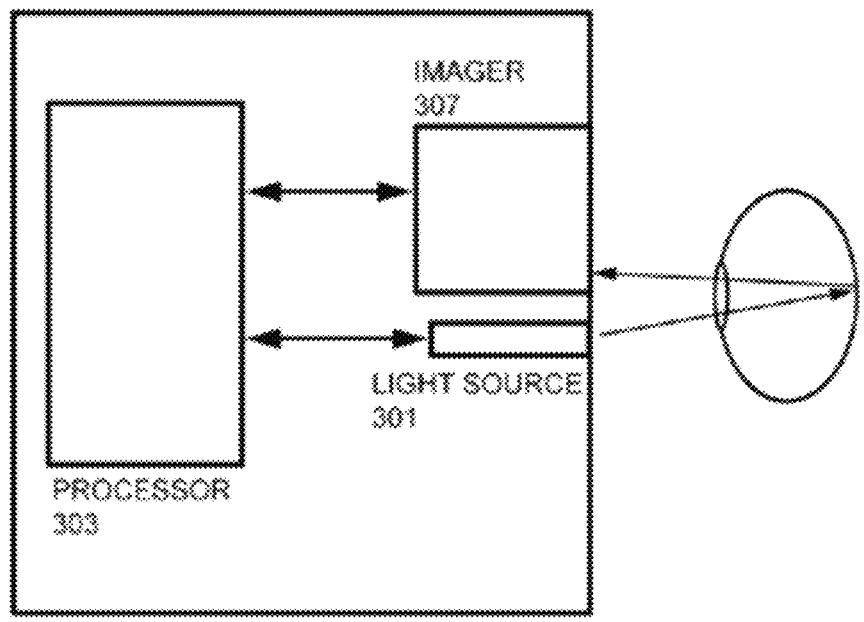
FIG. 3B is a block diagram of an exemplary apparatus where more efficiently the light source and imager, or an additional imager is disposed within the wavefront sensor instrument.

FIG. 3A and FIG. 3B are block diagrams of one or more exemplary apparatuses suitable to perform the methodology of the present invention. FIG. 3A is a block diagram of an exemplary apparatus suitable to quantify lens position of an ophthalmic lens worn by a subject. Processor 303 can run any suitable process to automatically quantify a lens position of an ophthalmic lens based on a shadow of one or more marks on a lens. The light source 301 for the illumination of the retina of the eye which provides the retro-illumination to make the shadow of the mark can be provided by the wavefront sensor instrument 305. Imager 307 can be a separate imager as shown in FIG. 3A. FIG. 3B is a block diagram of an exemplary apparatus where more efficiently the imager, or an additional imager, and light source 301 of the wavefront sensor instrument 305 are disposed within the wavefront sensor instrument 305. In other words, with only minor modifications including, without limitation, imaging of the shadows of the markers of the corrective by retro-illumination from the retina, the wavefront sensor instrument is capable of performing the location of the lens markers according to the principles of the methodology and system of the present invention.

Figure 4:
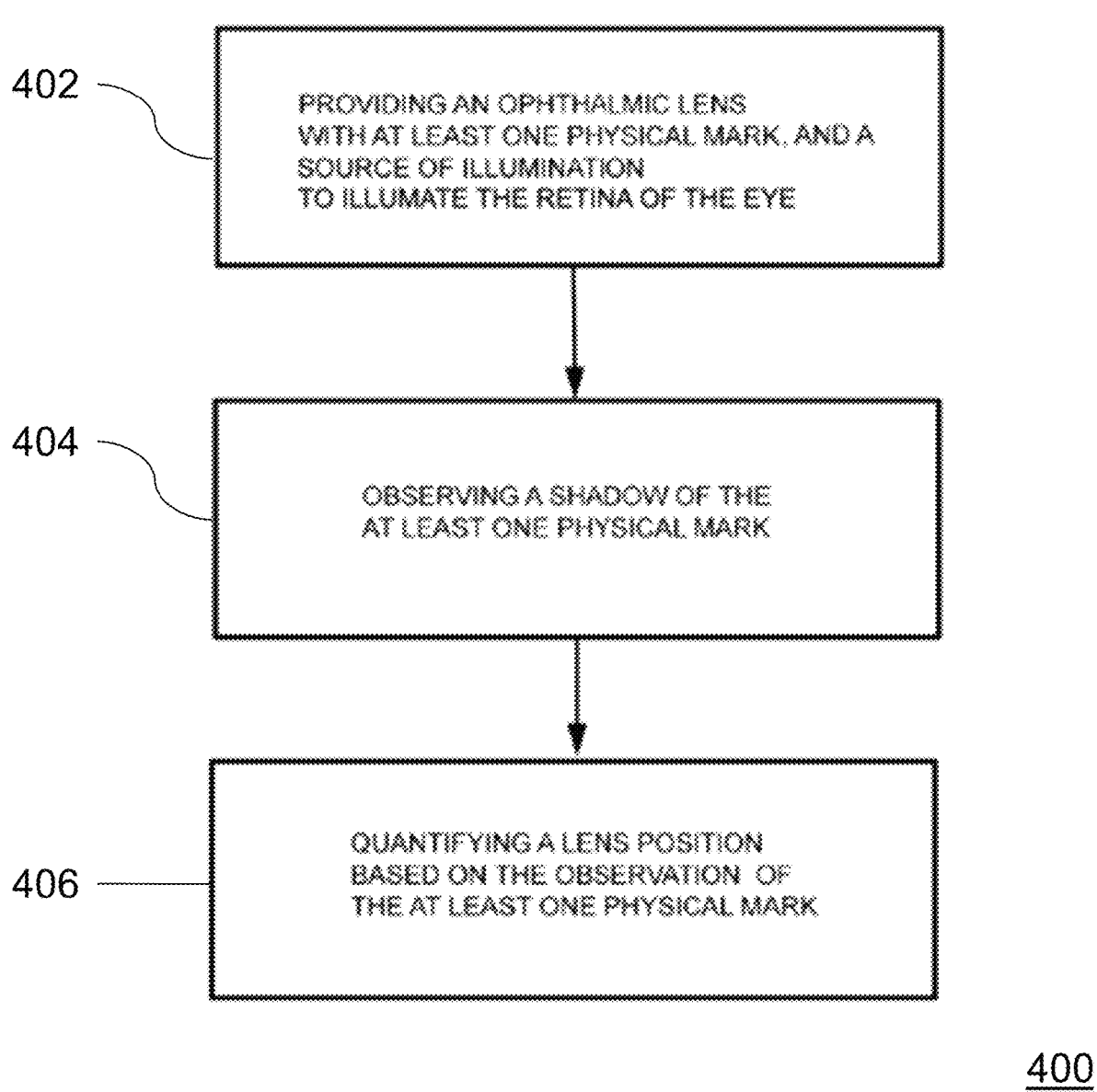
FIG. 4 is a flowchart illustrating an exemplary methodology in accordance with one or more illustrative embodiments of the present invention.

FIG. 4 is a drawing showing one exemplary process in the form of a flowchart 400 summarizing the steps of the new method according to the Application. In summary, a method or process 400 to determine or quantify lens position of an ophthalmic lens worn by a subject includes: a) providing the ophthalmic lens having at least one physical mark and a source of illumination to cause a reflected light from a retina of an eye (Step 402); B) observing (visually and/or by imaging) a shadow of the at least one physical mark in the reflected light (Step 404); and C) quantifying a lens position of the ophthalmic lens based on the observation of the shadow (Step 406).

Figure 5:
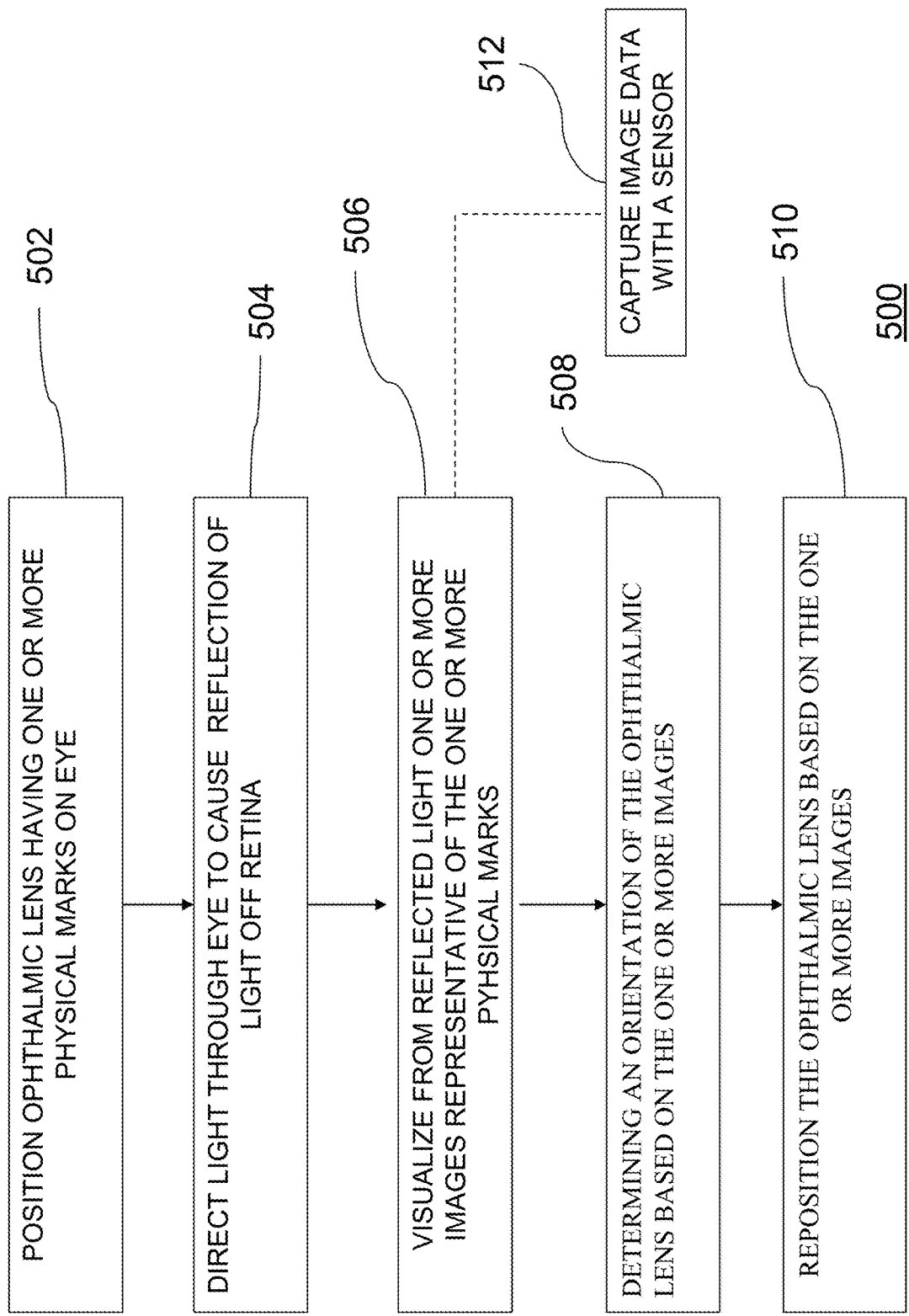
FIG. 5 is a flowchart illustrating another exemplary methodology in accordance with one or more illustrative embodiments of the present invention.

FIG. 5 is a flow chart illustrating another exemplary process 500 in accordance with the principles of the present invention. The process 500 includes positioning an ophthalmic lens having at least one physical mark on the subject's eye (Step 502); directing light through the eye to cause reflection of light off the retina of the eye (Step 504); visualizing from the reflected light an image representative of the one or more physical marks (Step 506); and determining an orientation of the ophthalmic lens based on the one or more images (Step 508). As a further option, the process 500 may include repositioning the ophthalmic lens based on the image (Step 510). In illustrative embodiment, the at least one physical mark includes at least two physical marks. One of the at least two physical marks may be disposed at the center of the lens. Another of the at least two physical marks may be at the periphery of the lens. In this embodiment, the image is representative of the at least two physical marks. In illustrative embodiments, the image may include one or more shadows of the mark or the at least two marks. In other illustrative embodiments, visualizing one or more images includes capturing, with a sensor, e.g., the wavefront sensor 305, image data associated with the one or more images (Step 512).

While the above example uses a scleral lens, decentration and rotation can be measured and applied to any suitable eye wear ranging from spectacles or eyeglasses, goggles, etc. to any suitable type of contact lenses including soft lenses, rigid gas permeable lenses, extended wear lenses, disposable lenses, intraocular lenses (IOL) or the like. The methodology and system of the present invention can also be used to measure decentration and rotation for writing corrective optics directly onto the cornea of the eye (e.g., by writing optical gratings onto the cornea of the eye).

Any software or firmware for design of lens, or for the operation of measurement equipment described hereinabove can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method to quantify lens position and rotation of an ophthalmic lens worn by a subject comprising:
   providing the ophthalmic lens having at least one physical mark and a source of illumination to cause a reflected light from a retina of an eye;
   observing a shadow of the at least one physical mark in the reflected light; and
   quantifying a lens position of the ophthalmic lens based on the shadow.

2. The method according to claim 1, wherein the step of providing comprises providing the ophthalmic lens having at least one physical mark including at least one of:
   a mark at a center of the ophthalmic lens;
   two or more marks at a periphery of the ophthalmic lens; or
   a mark at a center of the ophthalmic lens and one or more additional marks at a periphery of the ophthalmic lens.

3. The method according to claim 1, wherein the mark at a center of the ophthalmic lens comprises a crosshair.

4. The method according to claim 1, wherein the step of observing comprises imaging the at least one physical mark at an entrance pupil plane of the eye.

5. The method according to claim 1, wherein the step of quantifying comprises quantifying the lens position along a line of sight of the eye.

6. The method according to claim 1, wherein the step of providing comprises providing a wavefront sensor to cause the reflected light from the retina.

7. The method according to claim 6 further including measuring aberrations of the eye with the wavefront sensor.

8. The method according to claim 1, wherein the step of providing comprises providing at least one lathe mark.

9. The method according to claim 1, wherein the step of providing comprises providing at least one mark written by one of abrasion, ablation or laser.

10. The method according to claim 1, wherein the step of observing comprises observing the shadow of the at least one physical mark in the reflected light, the at least one physical mark otherwise substantially not visible by direct illumination to a front surface of the ophthalmic lens.

11. The method according to claim 1, wherein the step of providing comprises providing one of a freeform ophthalmic lens, soft contact lens, hard rigid gas permeable contact lens of scleral lens.

12. The method according to claim 1, wherein the step of providing comprises providing the ophthalmic lens having the at least one physical mark without an inking process.

* * * * *